US011720285B2

(12) United States Patent
Putta et al.

(10) Patent No.: US 11,720,285 B2
(45) Date of Patent: Aug. 8, 2023

(54) COMPUTER SYSTEM WITH DATA STORAGE TRANSFER RECOMMENDATION

(71) Applicant: Microsoft Technology Licensing, LLC, Redmond, WA (US)

(72) Inventors: Lakshmana Venkata Vihari Putta, Redmond, WA (US); Sriravi Kotagiri, Kirkland, WA (US); Suresh Tharamal, Bellevue, WA (US); Aruna Somendra, Hyderabad (IN)

(73) Assignee: Microsoft Technology Licensing, LLC

( * ) Notice: Subject to any disclaimer, the term of this patent is extended or adjusted under 35 U.S.C. 154(b) by 15 days.

(21) Appl. No.: 17/448,316

(22) Filed: Sep. 21, 2021

(65) Prior Publication Data

US 2023/0090503 A1    Mar. 23, 2023

(51) Int. Cl.
*G06F 3/06* (2006.01)

(52) U.S. Cl.
CPC ............ *G06F 3/0659* (2013.01); *G06F 3/064* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 10,496,302 | B1* | 12/2019 | Gaurav | G06F 3/065 |
| 2013/0138916 | A1* | 5/2013 | Ohara | G06F 3/0689 |
| | | | | 711/E12.078 |
| 2017/0300505 | A1* | 10/2017 | Belmanu Sadananda | |
| | | | | G06F 11/14 |
| 2019/0034447 | A1* | 1/2019 | Bent | G06F 16/2246 |
| 2020/0192603 | A1* | 6/2020 | Tanriover | G06F 3/0659 |
| 2020/0334163 | A1* | 10/2020 | Shergill | G06F 11/3409 |
| 2021/0055997 | A1* | 2/2021 | Kucherov | G06F 11/1451 |
| 2021/0117390 | A1* | 4/2021 | Chamarthy | G06F 11/1451 |

* cited by examiner

*Primary Examiner* — Stephanie Wu
(74) *Attorney, Agent, or Firm* — Ray Quinney & Nebeker; Tiffany Healy

(57) ABSTRACT

A computer system is provided, including a first data storage with a first retrieval latency, a second data storage with a second retrieval latency that is higher than the first retrieval latency, and a processor coupled to a memory that stores instructions, which cause the processor to store a series of recovery points of a data collection in the first data storage. For a current recovery point of the series of recovery points, the processor is further configured to compute a difference between an incremental changed block value of one or more prior recovery points and a number of memory blocks inherited from the one or more prior recovery points. The processor generates and outputs a storage transfer recommendation to store a subset of the one or more of the prior recovery points in the second data storage rather than the first data storage, based on the computed difference.

20 Claims, 10 Drawing Sheets

EXAMPLE (A)                                                              200

RP01{100% Churn}   :    A1-A5  A6-A10   A11-A15  A16-A20 ...  A100
RP02{005% Churn}   :    A1-A5 |B6-B10|  A11-A15  A16-A20 ...  A100
RP03{090% Churn}   :    A1-A5 |B6-B10| |C11-C15  C16-C20| ... |C100|
RP04{010% Churn}   :    A1-A5 |D6-D10   D11-D15| |C16-C20| ... |C100|
RP05{015% Churn}   :    |E1-E5||D6-D10| |E11-E15  E16-E20| ... |C100|

1. Processing Recovery Point #1 (RP01)

a. Populate Sequence-Number Blob

| 1-5 | 6-10 | 11-15 | 15-20 | 21-100 |  202
      |-----|------|-------|-------|--------|
      | 1   | 1    | 1     | 1     | 1      | b. Generate Individual Inherited Mapping   204

| Sequence-Number | # Blocks Inherited |
      |-----------------|--------------------|
      | 1               | 100                | c. Generate Effective Savings Mapping   206

| Snapshot Sequence-Number | Incremental-Size | # Blocks Inherited | Effective Savings |
      |--------------------------|------------------|--------------------|-------------------|
      | 1                        | 100              | 100                | 0                 | d. Maximum Savings-Set   208
      SS01: {}

2. Processing Recovery Point #2 (RP02)

a. Populate Sequence-Number Blob   210

| 1-5 | 6-10 | 11-15 | 15-20 | 21-100 |
      |-----|------|-------|-------|--------|
      | 1   | 2    | 1     | 1     | 1      | b. Generate Individual Inherited Mapping   212

| Sequence-Number | # Blocks Inherited |
      |-----------------|--------------------|
      | 1               | 95                 |
      | 2               | 5                  | c. Generate Effective Savings Mapping   214

| Snapshot Sequence-Number | Incremental-Size | # Blocks Inherited | Effective Savings |
      |--------------------------|------------------|--------------------|-------------------|
      | 1                        | 100              | 95                 | 5                 |
      | 2                        | 5                | 5                  | 0                 | d. Maximum Savings-Set   216
      SS02: {}

3. Processing Recovery Point #3 (RP03)

a. Populate Sequence-Number Blob   218

| 1-5 | 6-10 | 11-15 | 15-20 | 21-100 |
      |-----|------|-------|-------|--------|
      | 1   | 2    | 3     | 3     | 3      |

(CONTINUED IN FIG. 2B)

FIG. 2A (CONTINUED FROM FIG. 2A)

b. Generate Individual Inherited Mapping — 220

| Sequence-Number | # Blocks Inherited |
|---|---|
| 1 | 5 |
| 2 | 5 |
| 3 | 90 | c. Generate Effective Savings Mapping — 222

| Snapshot Sequence-Number | Incremental-Size | # Blocks Inherited | Effective Savings |
|---|---|---|---|
| 1 | 100 | 5 | 95 |
| 2 | 5 | 5 | 0 |
| 3 | 90 | 90 | 0 | d. Maximum Savings-Set — 224
SS03: {1, 2}

4. Processing Recovery Point #4 (RP04)

a. Populate Sequence-Number Blob — 226

| 1-5 | 6-10 | 11-15 | 15-20 | 21-100 |
|---|---|---|---|---|
| 1 | 4 | 4 | 3 | 3 | b. Generate Individual Inherited Mapping — 228

| Sequence-Number | # Blocks Inherited |
|---|---|
| 1 | 5 |
| 2 | 0 |
| 3 | 85 |
| 4 | 10 | c. Generate Effective Savings Mapping — 230

| Snapshot Sequence-Number | Incremental-Size | # Blocks Inherited | Effective Savings |
|---|---|---|---|
| 1 | 100 | 5 | 95 |
| 2 | 5 | 0 | 5 |
| 3 | 90 | 85 | 5 |
| 4 | 10 | 10 | 0 | d. Maximum Savings-Set — 232
SS04: {1, 2, 3}

5. Processing Recovery Point #5 (RP05)

a. Populate Sequence-Number Blob — 234

| 1-5 | 6-10 | 11-15 | 15-20 | 21-100 |
|---|---|---|---|---|
| 5 | 4 | 5 | 5 | 3 | b. Generate Individual Inherited Mapping — 236

| Sequence-Number | # Blocks Inherited |
|---|---|
| 1 | 0 |
| 2 | 0 |
| 3 | 80 |
| 4 | 5 |
| 5 | 15 | c. Generate Effective Savings Mapping — 238

| Snapshot Sequence-Number | Incremental-Size | # Blocks Inherited | Effective Savings |
|---|---|---|---|
| 1 | 100 | 0 | 100 |
| 2 | 5 | 0 | 5 |
| 3 | 90 | 80 | 10 |
| 4 | 10 | 5 | 5 |
| 5 | 15 | 15 | 0 | d. Maximum Savings-Set — 240
SS05: {1, 2, 3, 4}

Recommendation — 242
Union of SS01, SS02, SS03, SS04, SS05 => {1, 2, 3, 4}

FIG. 2B

EXAMPLE (B)
⎯500

```
RP01{100% Churn}  :    A1-A5   A6-A10  A11-A15 A16-A20 ... A100
RP02{005% Churn}  :    |B1-B5| A6-A10  A11-A15 A16-A20 ... A100
RP03{005% Churn}  :    |B1-B5||C6-C10| A11-A15 A16-A20 ... A100
RP04{015% Churn}  :    |D1-D5||D6-D10||D11-D15| A16-A20 ... A100
RP05{020% Churn}  :    |E1-E5  E6-E10  E11-E15 E16-E20| ... A100
```

1. Processing Recovery Point #1 (RP01)
   a. Populate Sequence-Number Blob

| 1-5 | 6-10 | 11-15 | 15-20 | 21-100 |
   |-----|------|-------|-------|--------|
   | 1   | 1    | 1     | 1     | 1      |
   ⎯502 b. Generate Individual Inherited Mapping ⎯504

| Sequence-Number | # Blocks Inherited |
   |-----------------|--------------------|
   | 1               | 100                | c. Generate Effective Savings Mapping ⎯506

| Snapshot Sequence-Number | Incremental-Size | # Blocks Inherited | Effective Savings |
   |--------------------------|------------------|--------------------|-------------------|
   | 1                        | 100              | 100                | 0                 | d. Maximum Savings-Set ⎯508
      SS01: {}

2. Processing Recovery Point #2 (RP02)
   a. Populate Sequence-Number Blob

| 1-5 | 6-10 | 11-15 | 15-20 | 21-100 |
   |-----|------|-------|-------|--------|
   | 2   | 1    | 1     | 1     | 1      |
   ⎯510 b. Generate Individual Inherited Mapping

| Sequence-Number | # Blocks Inherited |
   |-----------------|--------------------|
   | 1               | 95                 |
   | 2               | 5                  |
   ⎯512 c. Generate Effective Savings Mapping ⎯514

| Snapshot Sequence-Number | Incremental-Size | # Blocks Inherited | Effective Savings |
   |--------------------------|------------------|--------------------|-------------------|
   | 1                        | 100              | 95                 | 5                 |
   | 2                        | 5                | 5                  | 0                 | d. Maximum Savings-Set ⎯516
      SS02: {}

3. Processing Recovery Point #3 (RP03)
   a. Populate Sequence-Number Blob

| 1-5 | 6-10 | 11-15 | 15-20 | 21-100 |
   |-----|------|-------|-------|--------|
   | 2   | 3    | 1     | 1     | 1      |
   ⎯518

(CONTINUED IN FIG. 4B)

FIG. 4A (CONTINUED FROM FIG. 4A)

b. Generate Individual Inherited Mapping — 520

| Sequence-Number | # Blocks Inherited |
|---|---|
| 1 | 90 |
| 2 | 5 |
| 3 | 5 | c. Generate Effective Savings Mapping — 522

| Snapshot Sequence-Number | Incremental-Size | # Blocks Inherited | Effective Savings |
|---|---|---|---|
| 1 | 100 | 90 | 10 |
| 2 | 5 | 5 | 0 |
| 3 | 5 | 5 | 0 | d. Maximum Savings-Set — 524
   SS03: {}

4. Processing Recovery Point #4 (RP04)

a. Populate Sequence-Number Blob — 526

| 1-5 | 6-10 | 11-15 | 15-20 | 21-100 |
   |---|---|---|---|---|
   | 4 | 4 | 4 | 1 | 1 | b. Generate Individual Inherited Mapping — 528

| Sequence-Number | # Blocks Inherited |
   |---|---|
   | 1 | 85 |
   | 2 | 0 |
   | 3 | 0 |
   | 4 | 15 | c. Generate Effective Savings Mapping — 530

| Snapshot Sequence-Number | Incremental-Size | # Blocks Inherited | Effective Savings |
   |---|---|---|---|
   | 1 | 100 | 85 | 15 |
   | 2 | 5 | 0 | 5 |
   | 3 | 5 | 0 | 5 |
   | 4 | 15 | 15 | 0 | d. Maximum Savings-Set — 532
      SS04: {}

5. Processing Recovery Point #5 (RP05)

a. Populate Sequence-Number Blob — 534

| 1-5 | 6-10 | 11-15 | 15-20 | 21-100 |
   |---|---|---|---|---|
   | 5 | 5 | 5 | 5 | 1 | b. Generate Individual Inherited Mapping — 536

| Sequence-Number | # Blocks Inherited |
   |---|---|
   | 1 | 80 |
   | 2 | 0 |
   | 3 | 0 |
   | 4 | 0 |
   | 5 | 20 | c. Generate Effective Savings Mapping — 538

| Snapshot Sequence-Number | Incremental-Size | # Blocks Inherited | Effective Savings |
   |---|---|---|---|
   | 1 | 100 | 80 | 20 |
   | 2 | 5 | 0 | 5 |
   | 3 | 5 | 0 | 5 |
   | 4 | 15 | 0 | 15 |
   | 5 | 20 | 20 | 0 | d. Maximum Savings-Set — 540
      SS05: {4}

Recommendation — 542
Union of SS01, SS02, SS03, SS04, SS05 => {4}

FIG. 4B

EXAMPLE (C)

```
RP01{100% Churn} :    A1-A5  A6-A10  A11-A15  A16-A20 ... A100
RP02{005% Churn} :    B1-B5  A6-A10  A11-A15  A16-A20 ... A100
RP03{005% Churn} :    B1-B5  C6-C10  A11-A15  A16-A20 ... A100
RP04{005% Churn} :    B1-B5  C6-C10  D11-D15  A16-A20 ... A100
RP05{005% Churn} :    E1-E5  E6-E10  E11-E15  E16-E20 ... A100
```
— 600

1. Processing Recovery Point #1 (RP01)
   a. Populate Sequence-Number Blob — 602

| 1-5 | 6-10 | 11-15 | 15-20 | 21-100 |
   |---|---|---|---|---|
   | 1 | 1 | 1 | 1 | 1 | b. Generate Individual Inherited Mapping — 604

| Sequence-Number | # Blocks Inherited |
   |---|---|
   | 1 | 100 | c. Generate Effective Savings Mapping — 606

| Snapshot Sequence-Number | Incremental-Size | # Blocks Inherited | Effective Savings |
   |---|---|---|---|
   | 1 | 100 | 100 | 0 | d. Maximum Savings-Set — 608
      SS01: {}

2. Processing Recovery Point #2 (RP02)
   a. Populate Sequence-Number Blob — 610

| 1-5 | 6-10 | 11-15 | 15-20 | 21-100 |
   |---|---|---|---|---|
   | 2 | 1 | 1 | 1 | 1 | b. Generate Individual Inherited Mapping — 612

| Sequence-Number | # Blocks Inherited |
   |---|---|
   | 1 | 95 |
   | 2 | 5 | c. Generate Effective Savings Mapping — 614

| Snapshot Sequence-Number | Incremental-Size | # Blocks Inherited | Effective Savings |
   |---|---|---|---|
   | 1 | 100 | 95 | 5 |
   | 2 | 5 | 5 | 0 | d. Maximum Savings-Set — 616
      SS02: {}

3. Processing Recovery Point #3 (RP03)
   a. Populate Sequence-Number Blob — 618

| 1-5 | 6-10 | 11-15 | 15-20 | 21-100 |
   |---|---|---|---|---|
   | 2 | 3 | 1 | 1 | 1 |

(CONTINUED IN FIG. 5B)

FIG. 5A (CONTINUED FROM FIG. 5A)

b. Generate Individual Inherited Mapping — 620

| Sequence-Number | # Blocks Inherited |
|---|---|
| 1 | 90 |
| 2 | 5 |
| 3 | 5 | c. Generate Effective Savings Mapping — 622

| Snapshot Sequence-Number | Incremental-Size | # Blocks Inherited | Effective Savings |
|---|---|---|---|
| 1 | 100 | 90 | 10 |
| 2 | 5 | 5 | 0 |
| 3 | 5 | 5 | 0 | d. Maximum Savings-Set — 624
SS03: {}

4. Processing Recovery Point #4 (RP04)

a. Populate Sequence-Number Blob — 626

| 1-5 | 6-10 | 11-15 | 15-20 | 21-100 |
|---|---|---|---|---|
| 2 | 3 | 4 | 1 | 1 | b. Generate Individual Inherited Mapping — 628

| Sequence-Number | # Blocks Inherited |
|---|---|
| 1 | 85 |
| 2 | 5 |
| 3 | 5 |
| 4 | 5 | c. Generate Effective Savings Mapping — 630

| Snapshot Sequence-Number | Incremental-Size | # Blocks Inherited | Effective Savings |
|---|---|---|---|
| 1 | 100 | 85 | 15 |
| 2 | 5 | 5 | 0 |
| 3 | 5 | 5 | 0 |
| 4 | 5 | 5 | 0 | d. Maximum Savings-Set — 632
SS04: {}

5. Processing Recovery Point #5 (RP05)

a. Populate Sequence-Number Blob — 634

| 1-5 | 6-10 | 11-15 | 15-20 | 21-100 |
|---|---|---|---|---|
| 5 | 5 | 5 | 5 | 1 | b. Generate Individual Inherited Mapping — 636

| Sequence-Number | # Blocks Inherited |
|---|---|
| 1 | 80 |
| 2 | 0 |
| 3 | 0 |
| 4 | 0 |
| 5 | 20 | c. Generate Effective Savings Mapping — 638

| Snapshot Sequence-Number | Incremental-Size | # Blocks Inherited | Effective Savings |
|---|---|---|---|
| 1 | 100 | 80 | 20 |
| 2 | 5 | 0 | 5 |
| 3 | 5 | 0 | 5 |
| 4 | 5 | 0 | 5 |
| 5 | 20 | 20 | 0 | d. Maximum Savings-Set — 640
SS05: {}

Recommendation — 642
Union of SS01, SS02, SS03, SS04, SS05 => {}

FIG. 5B

COMPUTER SYSTEM WITH DATA STORAGE TRANSFER RECOMMENDATION

BACKGROUND

Cloud backup is a type of data backup in which a copy of data is sent over a proprietary or public network to a secure cloud-based server. Many organizations have found traditional on-premise tape backup methods to be difficult, expensive, and unreliable, and are increasingly adopting cloud backup solutions and moving data, applications, and infrastructure to the cloud. However, cloud backup solutions come at a cost for such organizations, and these costs can slow adoption of cloud backup solutions by such organizations.

SUMMARY

A computer system and method are provided. The computer system includes a first data storage configured to store a plurality of blocks of data in a data collection at a first retrieval latency, a second data storage having a second retrieval latency that is higher than the first retrieval latency, and a processor coupled to a memory that stores instructions, which, upon execution by the processor, cause the processor to store a series of recovery points of the data collection in the first data storage. For a current recovery point of the series of recovery points, the processor is further configured to compute a difference between an incremental changed block value of one or more prior recovery points and a number of memory blocks inherited from the one or more prior recovery points by the current recovery point. The processor is further configured to generate a storage transfer recommendation to store a subset of the one or more of the prior recovery points in the second data storage rather than the first data storage, based on the computed difference, and output the storage transfer recommendation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A and 2B show an example of the storage transfer recommendation algorithm being performed on a set of incremental data backups using the computing system of FIG. 1.

FIGS. 4A and 4B show an example of the storage transfer recommendation algorithm being performed on another set of incremental data backups using the computing system of FIG. 1.

FIGS. 5A and 5B show an example of the storage transfer recommendation algorithm being performed on another set of incremental data backups using the computing system of FIG. 1.

DETAILED DESCRIPTION

Cloud backup storage services enable organizations to back up data to a remote cloud-based server and store a copy of data in a secure cloud storage system. The backup process is automatic and cloud backup storage can be accessed from anywhere at any time. Generally, cloud backup storage services offer multiple storage classes or tiers such as a three-tiered approach including hot storage, cool storage, and cold storage, or a two-tiered approach including hot and cold storage. The hot storage is optimized for storing data that is accessed frequently. The cool storage is optimized for less frequently accessed data that needs to stay accessible without a restore process. The cold storage is an archival tier that stores data economically for long periods of time.

As discussed above, cloud backup storage services come at a cost for such organizations, and it is critical to utilize an appropriate backup storage to reduce data storage costs, depending on types of backup data. For instance, organizations may want to transfer unused or otherwise archivable data to an archive storage. However, organizations may experience that their overall storage cost would increase when recovery points are transferred to an archive storage randomly. To enable organizations to reduce the costs associated with cloud backup storage, a computer system is disclosed herein that is configured to implement a recommendation algorithm to make a storage transfer recommendation for less costly storage alternatives.

Figure 1:
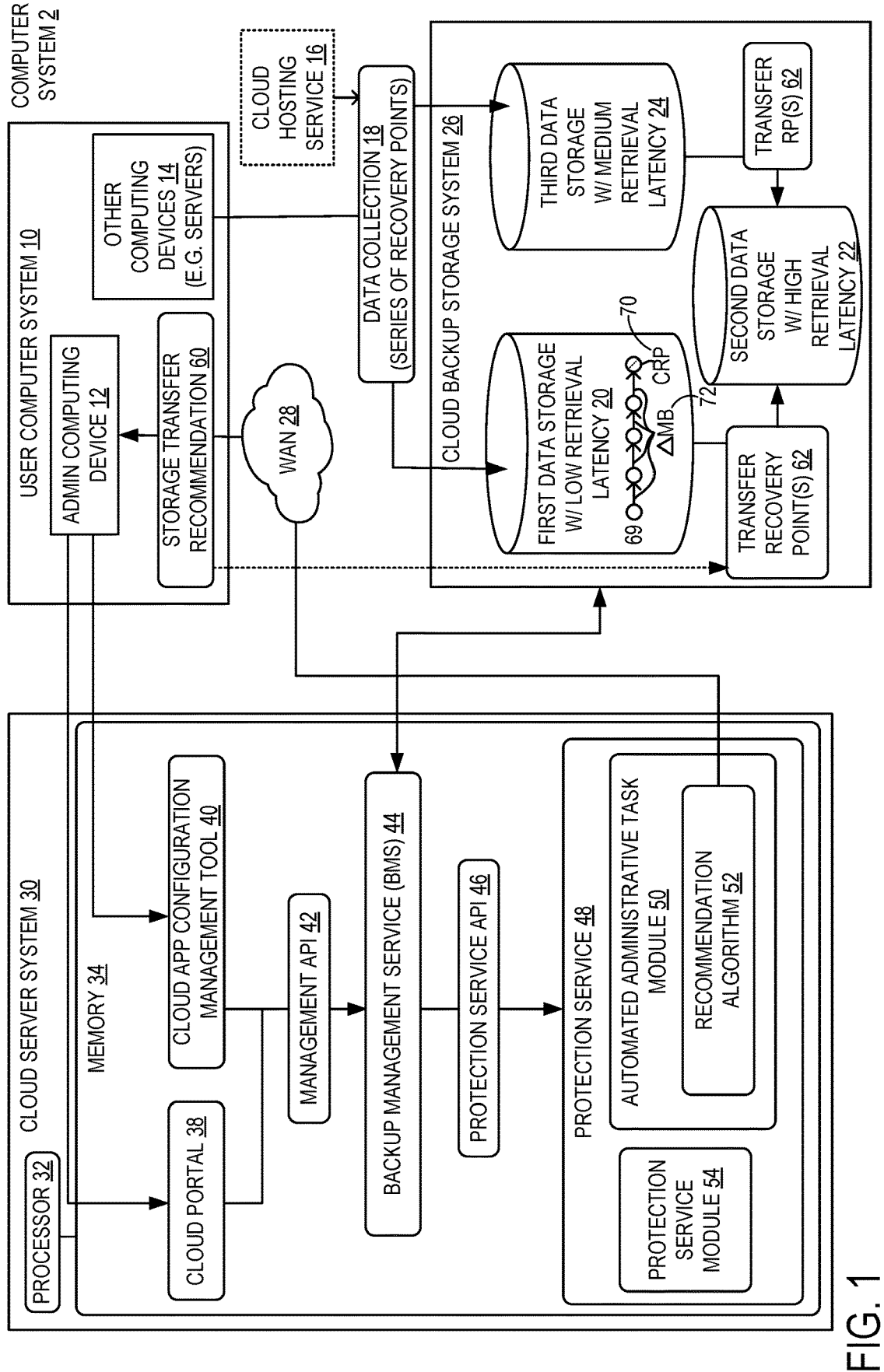
FIG. 1 shows a schematic view of a computer system configured to implement a recommendation algorithm to output a storage transfer recommendation to transfer data from a first data storage to a second data storage, according to one example implementation of the present disclosure.

FIG. 1 shows a schematic view of a computer system 2 including a cloud server system 30 that is configured to implement a recommendation algorithm 52 to output a storage transfer recommendation 60 to transfer data from a first data storage 20 to a second data storage 22, according to one example implementation of the present disclosure. In the depicted configuration, the cloud server system 30 may include a processor 32 and memory 34, which may be operatively coupled to each other by a communications bus. The processor 32 and memory 34 may each be configured as one or more physical components such as one or more processor cores and/or one or more physical memory modules.

The computer system 2 further includes a cloud backup storage system 26 that includes a first data storage 20, second data storage 22, and third data storage 24, configured to store a plurality of blocks of data in a data collection 18 upon execution by the processor 32 of the cloud server system 30. The first data storage 20 (e.g., hot storage) may store data at a lower retrieval latency and higher transaction rates. Storage devices such as a hard disk drive or solid-state drive may be used as the first data storage 20. The first data storage 20 is optimized for storing data that is accessed frequently. Although the first data storage 20 is fast and easily accessible, it comes at a higher storage cost. On the other hand, the second data storage 22 (e.g., archive storage) may store data at a higher retrieval latency and lower transaction rates. A hard disk drive or tape storage drive may be used as the second data storage 22. The second data storage 22 is a cost-effective storage option for long-term preservation of data. In one example implementation, the difference between the first retrieval latency and the second retrieval latency may be at least six orders of magnitude. In other implementations, the latency difference may be another value, such as three, four, or five orders of magnitude. Further, the third data storage 24 may store data at an intermediate retrieval latency which is higher than that of the first data storage 20 and lower than that of the second data storage 22. Storage devices such as hard disk drives or solid-state drives may be used as the third data storage 24. It will be appreciated that in some circumstances, a user is able to save on their total storage costs by transferring archivable data to the second data storage 22 and making effective use of the second data storage 22.

The cloud server system 30 includes a cloud portal 38 and cloud application configuration management tool 40, which communicates with an admin computing device 12 of the user computer system 10. A user manages cloud services including cloud backup storage services through the cloud portal 38 and cloud application configuration management tool 40. The cloud portal 38 is a single portal that enables a user access and manage all cloud applications. The cloud application configuration management tool 40 is a framework that enables a user to automate and manage cloud services, and may be a command line tool that enables a user to perform tasks such as managing storage of data. The cloud server system 30 includes backup management service (BMS) 44 that is accessed and managed by the cloud portal 38 or cloud application configuration management tool 40 via a management API 46. The backup management service (BMS) 44 configures the cloud backup storage system 26 to store a series of backup recovery points 69 of the data collection 18 in the first data storage 20. The series of backup recovery points 69 of the data collection 18 are transmitted to the first data storage 20 and/or third data storage 24 from user computer devices 14 and/or cloud hosting service 16. The data collection 18 may include binary large object (BLOB) data that the user desires to store and protect in the cloud backup storage system 26. Alternatively, other object data storage formats may be utilized. A BLOB is a collection of binary data stored as a single entity, which may include images, audio or other multimedia objects. Other collection formats may alternatively be adopted for storing objects, as appropriate.

The backup management service (BMS) 44 further manages a protection service 48 via a protection service API 46. The protection service 48 includes a protection service module 54 and an automated administrative task module 50 which contains a recommendation algorithm 52. For a current recovery point 70 of the series of recovery points 69, the recommendation algorithm 52 included in protection service 48 determines an incremental changed block value 72 of one or more prior recovery points and a number of memory blocks inherited from the one or more prior recovery points by the current recovery point, and then computes a difference between the incremental changed block value 72 of the one or more prior recovery points and the number of memory blocks inherited from the one or more prior recovery points by the current recovery point.

In one specific implementation, the recommendation algorithm may loop through all recovery points to make its recommendation. Thus, the current recovery point described above may be one of a plurality of current recovery points associated with each successive iteration of a loop, and the processor may be configured to compute the difference for each recovery point in the series of recovery points as described below.

The algorithm 52 then generates a storage transfer recommendation 60 to store a subset of the one or more of the prior recovery points in the second data storage 22 rather than the first data storage 20, based on the computed difference, and outputs the storage transfer recommendation 60 to the admin computing device 12 via a wide area network (WAN) 28, such as the Internet. It will be appreciated that the subset of the one or more of the prior recovery points may include all of the one or more of the prior recovery points.

FIGS. 2A and 2B show an example of the storage transfer recommendation algorithm being performed on a set of incremental data backups using the computing system of FIG. 1. In the depicted example 200 in FIG. 2A, the first data storage 20 stores one hundred data blocks (A1, A2, A3 . . . A98, A99, A100) as a first recovery point (RP01), which is a full backup in this example. Each block is 16 KB in size. After the initial backup, a portion of the data (A6-A10) is changed and saved (B6-B10) in the second recovery point (RP02), which, it will be appreciated, is an incremental backup. An incremental backup only stores a portion of the data that has changed since the last full backup. By using incremental backups, there is no need to perform regular full backups at each backup point, after the first full back up has been made. As a result, storage consumption can be much lower for incremental backups than for a full backup. After the second backup, another portion of the data (A11-A100) is changed and saved (C11-C100) as part of an incremental backup in the third recovery point (RP03). Following the third backup, another portion of the data (B6-B10 and C11-C15) is changed and saved (D6-D10 and D11-D15) as part of an incremental backup at the fourth recovery point (RP04). After the fourth backup, another portion of data (A1-A5, D11-D15, and C16-C20) is changed and saved (E1-E5, E11-E15, and E16-E20) as part of an incremental backup at the fifth recovery point (RP05).

As depicted in the above example, when there is one full backup and the remaining backups are incremental, the storage transfer recommendation algorithm 52 determines a set of backups that can be transferred to the second data storage 22 in order for a user to save on overall storage costs, referred to herein as a maximum savings set. Following a backup, the algorithm 52 loops through each recovery point in the series, and on each loop, for a current recovery point for that loop, uses a process to create an individual inherited mapping, determine the number of memory blocks inherited from each recovery point by the current recovery point, determine the incremental changed block value, which indicates the number of changed blocks of data in each recovery point relative to a latest prior recovery point, and generate an effective memory savings mapping to determine the maximum savings set for each recovery point. At the first step of the process, the algorithm 52 assigns each prior recovery point and the current recovery point a unique number in an incremental fashion, referred to as a sequence number. The algorithm 52 uses the sequence number to generate an individual inherited mapping, which maps a sequence number of each respective recovery point to a number of memory blocks inherited from each recovery point by the current recovery point and determines a recovery point in which a particular data block was last changed. The algorithm 52 then uses the individual inherited mapping to generate an effective savings mapping, which maps a predicted effective memory savings to each recovery point. For each recovery point, the predicted effective memory savings is calculated by determining the difference between the incremental changed block value for each recovery point and the number of memory blocks inherited from each recovery point by the current recovery point (i.e., from recovery points that occur before the current recovery point under analysis).

In the next step, once the effective savings are calculated for each recovery point, the algorithm 52 identifies a subset of the one or more of the prior recovery points, which is the maximum savings set, to transfer to the second data storage based on the effective memory savings mapping by comparing the effective savings of the recovery point with the second greatest sequence number to a predetermined minimum saving value, which is a predetermined threshold for the predicted effective memory savings. Thus, the recovery point with the greatest sequence number, which corresponds to the current recovery point, is excluded for computation, as the effective savings for the greatest sequence number is zero. If the effective savings does not satisfy the minimum saving value, the algorithm 52 considers the effective savings of the backup with the third greatest sequence number in addition to the recovery point with the second greatest sequence number, computing the average of the effective savings and comparing the value to the minimum saving value. If the average of the effective savings of the two recovery points does not satisfy the minimum saving value, the algorithm 52 considers the effective savings of the recovery point with the fourth greatest sequence number in addition to the previously considered two recovery points, computing the average of the effective savings and comparing the value to the minimum savings value. The algorithm 52 continues to consider the effective savings of the recovery point with the next greatest sequence number until the calculated effective savings satisfies the minimum savings value. The algorithm 52 then determines the maximum savings set for the recovery point that can be transferred to the second data storage 22.

In the depicted example as described in FIGS. 2A and 2B above, the first recovery point is assigned to a sequence number 1, the second recovery point is assigned to a sequence number 2, the third recovery point is assigned to a sequence number 3, the fourth recovery point is assigned to a sequence number 4, and the fifth recovery point is assigned to a sequence number 5. The algorithm 52 processes the first recovery point (RP01) in the first data storage 20 and the sequence number 1 is assigned to each of the one hundred blocks of data to indicate that the blocks of data were last changed in the first recovery point, as depicted in Table 202. Since the one hundred blocks of data are assigned a sequence number 1, the algorithm 52 determines that one hundred blocks of data are inherited from the first recovery point, and the algorithm 52 generates an individual inherited mapping that indicates that the one hundred blocks of data (A1-A100) are assigned the sequence number 1 for the first recovery point, as shown in Table 204.

The algorithm 52 then generates an effective savings mapping to map a predicted effective memory savings to each recovery point, as discussed above. In the depicted example above, the algorithm 52 generates an effective savings mapping by determining the difference between incremental changed block value of one hundred blocks of data (A1-A100) and one hundred blocks of data inherited from the first recovery point for the sequence number 1, as shown in Table 206. As this is an initial full backup, the difference is zero, which indicates that the effective savings for the backup are zero and no blocks of data from this backup may be transferred to the second data storage 22.

In the next step as discussed above, the algorithm 52 determines the maximum savings set for the recovery point by comparing the effective savings of a backup with the second greatest sequence number to a predetermined minimum saving value, which is fifteen in the depicted example. Since this is an initial backup, there is no recovery point that is assigned a second sequence number. Thus, the algorithm 52 identifies that no blocks of data are in the maximum savings set (SS01) which may be transferred to the second data storage 22 for the first recovery point, as shown in 208.

The algorithm 52 performs the same computation as demonstrated above in a loop for each new backup recovery point. For the second recovery point (RP02) as depicted in FIG. 2A, five blocks of the data (A6-A10) are changed and saved (B6-B10). As discussed above, a total of one hundred blocks of the data was saved (A1-A100) in the first recovery point (RP01). The algorithm 52 assigns the sequence number 2 to the portion of data that is changed (B6-B10) in the second recovery point (RP02), as shown in Table 210. The algorithm 52 generates the individual inherited mapping to determine that, in the second recovery point, ninety-five blocks of data (A1-A5 and A11-A100) are assigned the sequence number 1, and five blocks of data (B6-B10) are assigned the sequence number 2, as shown in Table 212. The algorithm 52 then generates the effective savings mapping that maps a predicted effective memory savings to each recovery point, as shown in Table 214. The mapping determines that the effective savings for the sequence number 1 are five blocks of data (A6-A10) by computing the difference between incremental changed block value of one hundred blocks of data (A1-A100) and ninety-five blocks of data inherited from the first recovery point for the sequence number 1. The mapping also determines that the effective savings for the sequence number 2 are zero, by determining the difference between incremental changed block value of five blocks of data (B6-B10) and five blocks of data inherited from the second recovery point for the sequence number 2.

In the next step, the algorithm 52 determines the maximum savings set for the second recovery point by comparing the effective savings of the recovery point with the second greatest sequence number to a predetermined minimum saving value of fifteen. The second greatest sequence number in this iteration is the sequence number 1 in the depicted example and the effective savings for the first recovery point is five, which does not satisfy the minimum savings value of fifteen. Thus, the algorithm 52 identifies that no blocks of data are in the maximum savings set (SS02) which may be transferred to the second data storage 22 for the second recovery point, as shown in 216.

In the third recovery point (RP03), a total of ninety blocks of the data (A11-A100) are incrementally changed and saved (C11-C100). As discussed above, a total of five blocks of the data was incrementally changed and saved (B6-B10) in the second recovery point, and a total of one hundred blocks of the data was incrementally changed and saved (A1-A100) in the first recovery point. The algorithm 52 assigns the sequence number 3 to the portion of data that is changed (C11-C100) in the third recovery point, as shown in Table 218. The algorithm 52 generates an individual inherited mapping to determine that, in the third recovery point, five blocks of data (A1-A5) are assigned the sequence number 1, five blocks of data (B6-B10) are assigned the sequence number 2, and ninety blocks of data (C11-C100) are assigned the sequence number 3, as shown in Table 220 of FIG. 2B. The algorithm 52 then generates an effective savings mapping which determines that the effective savings are ninety-five blocks of data for the recovery point assigned the sequence number 1, zero blocks of data for the recovery point assigned the sequence number 2, and zero blocks of data for the recovery point assigned the sequence number 3, by determining the difference between the incremental changed block value and the number of memory blocks inherited from prior recovery points, as shown in Table 222 of FIG. 2B.

In the next step, the algorithm 52 determines the maximum savings set for the third recovery point (RP03) by comparing the effective savings of the recovery point with the second greatest sequence number (which in this iteration is the sequence number 2) to a predetermined minimum saving value of fifteen. The effective savings for the recovery point assigned the sequence number 2 is zero, which does not satisfy the minimum savings value of fifteen. Thus, the algorithm 52 considers the recovery point assigned the sequence number 1 in addition to the recovery point assigned the sequence number 2 and compares the average of the effective savings to the minimum savings value of fifteen. The average of the effective savings of the recovery points assigned sequence numbers 1 and 2 is 47.5, which satisfies the minimum savings value of fifteen. Thus, the algorithm 52 identifies the effective savings from the recovery points assigned the sequence numbers 1 and 2 as the maximum savings set (SS03) which can be safely transferred to the second data storage 22 for the third recovery point, as shown in 224.

In the fourth recovery point (RP04), a total of ten blocks of the data (B6-B10 and C11-C15) is incrementally changed and saved (D6-D15). As discussed above, a total of ninety blocks of the data was incrementally changed and saved (C11-C100) in the third recovery point, a total of five blocks of the data was incrementally changed and saved (B6-B10) in the second recovery point, and a total of one hundred blocks of the data was incrementally changed and saved (A1-A100) in the first recovery point. The algorithm 52 assigns the sequence number 4 to the portion of data that is changed (D6-D15) in the fourth recovery point as shown in Table 226. The algorithm 52 generates an individual inherited mapping to determine that, in the fourth recovery point, five blocks of data (A1-A5) are assigned the sequence number 1, no blocks of data are assigned the sequence number 2, eighty-five blocks of data (C16-C100) are assigned the sequence number 3, and ten blocks of data (D6-D15) are assigned the sequence number 4, as shown in Table 228. The algorithm 52 then generates an effective savings mapping which determines that the effective savings are ninety-five blocks of data for the recovery point assigned the sequence number 1, five blocks of data for the recovery point assigned the sequence number 2, five blocks of data for the recovery point assigned the sequence number 3, and zero savings for the recovery point assigned the sequence number 4 by determining the difference between the incremental changed block value and the number of memory blocks inherited from prior recovery points, as shown in Table 230.

In the next step, the algorithm 52 determines the maximum savings set for the recovery point by comparing the effective savings of the recovery point with the second greatest sequence number (which in this iteration is the sequence number 3) to a predetermined minimum saving value of fifteen. The effective savings for the sequence number 3 is five, which does not satisfy the minimum savings value of fifteen. Thus, the algorithm 52 considers the recovery point assigned the sequence number 2 in addition to the recovery point assigned the sequence number 3 and compares the average of the effective savings to the minimum savings value of fifteen. The average of the effective savings of the recovery points assigned the sequence numbers 2 and 3 is five, which does not satisfy the minimum savings value of fifteen. Thus, the algorithm 52 further considers the recovery point assigned the sequence number 1 in addition to the previously considered recovery points assigned the sequence numbers 2 and 3 and compares the average of the effective savings to the minimum savings value of fifteen. The average of the effective savings of the recovery points assigned sequence numbers 1, 2, and 3 is 35, which satisfies the minimum savings value of fifteen. Thus, the algorithm 52 identifies the effective savings from the recovery points assigned the sequence numbers 1, 2, and 3 as the maximum savings set (SS04) which can be safely transferred to data storage 22 for the fourth recovery point, as shown in 232.

In the fifth recovery point (RP05), a total of fifteen blocks of the data (A1-A5 and D11-D20) is incrementally changed and saved (E1-E5 and E11-E20). The algorithm 52 assigns the sequence number 5 to the portion of data that is changed (E1-E5 and E11-E20) in the fifth recovery point, the sequence number 4 to the portion of data that is changed (D6-D10) in the fourth recovery point, and the sequence number 3 to the portion of data that is changed (C21-C100) in the third recovery point, as shown in Table 234. The algorithm 52 generates an individual inherited mapping to determine that, in the fourth recovery point, no blocks of data are assigned the sequence number 1, no blocks of data are assigned the sequence number 2, eighty blocks of data (C21-C100) are assigned the sequence number 3, five blocks of data (D6-D10) are assigned the sequence number 4, and fifteen blocks of data (E1-E5 and E11-E20) are assigned the sequence number 5, as shown in Table 236. The algorithm 52 then generates an effective savings mapping which determines that the effective savings are one hundred blocks of data for the recovery point assigned the sequence number 1, five blocks of data for the recovery point assigned the sequence number 2, ten blocks of data for the recovery point assigned the sequence number 3, five blocks of data for the recovery point assigned the sequence number 4, and zero savings for the recovery point assigned the sequence number 5, by determining the difference between the incremental changed block value and the number of memory blocks inherited from prior recovery points, as shown in Table 238.

In the next step, as shown in 240, the algorithm 52 determines the maximum savings set (SS05) for the fifth recovery point (RP05) by comparing the effective savings of the recovery point with the second greatest sequence number (which in this iteration is the sequence number 4) to a predetermined minimum saving value of fifteen. The effective savings for the recovery point assigned the sequence number 4 is five, which does not satisfy the minimum savings value of fifteen. Thus, the algorithm 52 considers the recovery point assigned the sequence number 3 in addition to the recovery point assigned the sequence number 4 and compares the average of the effective savings to the minimum savings value. The average of the effective savings of the recovery points assigned the sequence number 3 and sequence number 4 is 7.5, which does not satisfy the minimum savings value of fifteen. The algorithm 52 proceeds to consider the recovery point assigned the sequence number 2 in addition to the previously considered recovery points assigned sequence numbers 3 and 4 and compares the average of the effective savings to the minimum savings value. The average of the effective savings of the recovery points assigned sequence numbers 2, 3, and 4 is 6.7, which does not meet the minimum savings value of fifteen. The algorithm 52 proceeds to consider the recovery point assigned the sequence number 1 in addition to the previously considered recovery points assigned sequence numbers 2, 3, and 4 and compares the average of the effective savings to the minimum savings value of fifteen. The average of the effective savings of the recovery points assigned sequence numbers 1, 2, 3, and 4 is thirty, which satisfies the minimum savings value of fifteen. Therefore, the algorithm 52 identifies the effective savings from the recovery points assigned the sequence numbers 1, 2, 3, and 4 as the maximum savings set (SS05) which can be safely transferred to data storage 22 for the fifth recovery point, as shown in 240.

After looping through each recovery point in the series and repeating the process above to determine the maximum savings set for each recovery point as discussed above, the algorithm 52 determines a recommendation set, which is the union of the maximum savings sets from all recovery points, and makes a transfer recommendation for the recommendation set that may be transferred to archive for a user's maximum savings on storage. In the depicted example above, the algorithm 52 determines that no recovery points are included in the maximum savings set for the first recovery point; no recovery points are included in the maximum savings set for the second recovery point; the recovery points assigned the sequence numbers 1 and 2 are included in the maximum savings set for the third recovery point; the recovery points assigned the sequence numbers 1, 2, and 3 are included in the maximum savings set for the fourth recovery point; and the recovery points assigned the sequence numbers 1, 2, 3, and 4 are included in the maximum savings set for the fifth recovery point. The algorithm 52 determines that the union of the maximum savings set from each recovery point, which is the recommendation set, includes the effective savings from the recovery points assigned the sequence numbers 1, 2, 3, and 4, and thus recommends that the union of the effective savings from first through fifth backups be transferred to the second data storage 22 to maximize the user's savings, as described in 242 of FIG. 2B. That is, the algorithm 52 determines that one hundred blocks of data (A11-A100) from the first recovery point, five blocks of data (B6-B10) from the second recovery point, ten blocks of data (C11-C20) from the third recovery point, and five blocks of data (D11-D15) from the fourth recovery point may be transferred to the second data storage 22 from the first data storage 20 and deleted from the first data storage 20.

Figure 3:
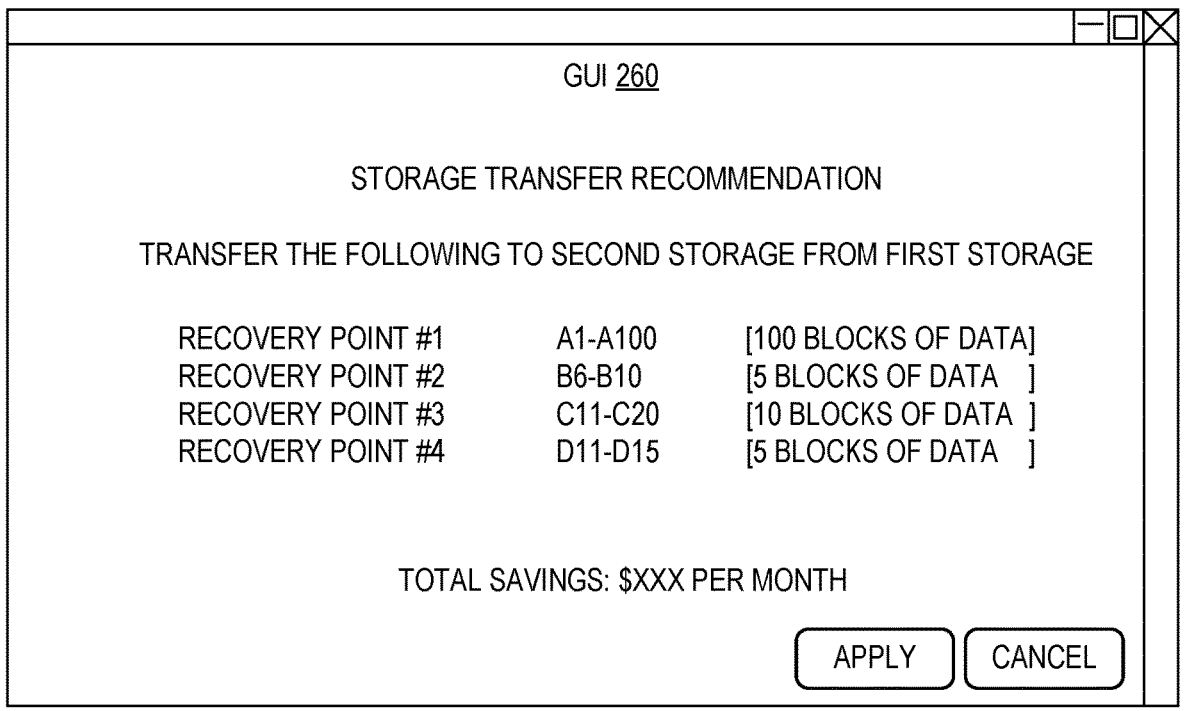
FIG. 3 shows a schematic view of an example GUI outputting a storage transfer recommendation determined by the recommendation algorithm using the computing system of FIG. 1.

FIG. 3 shows a schematic view of an example GUI outputting a storage transfer recommendation determined by the recommendation algorithm 52 using the computing system of FIG. 1. Once the algorithm 52 determines the recommendation set that may be transferred to the second data storage 22 from the first data storage 20 as described above, the algorithm 52 outputs a storage recommendation 60 based on the recommendation set to the admin computing device 12 of the user computer system 10 of FIG. 1 via GUI 260 of FIG. 5. The GUI 260 displays that one hundred blocks of data (A1-A100) from the first recovery point, five blocks of data (B6-B10) from the second recovery point, ten blocks of data (C11-C20) from the third recovery point, and five blocks of data (D11-D15) from the fourth recovery point may be transferred to the second data storage 22 from the first data storage 20, and this transfer can save $XXX per month for the user. The user may accept or ignore the storage recommendation 60 by clicking "APPLY" or "CANCEL". When the user accepts the storage recommendation 60, the BMS 44 of FIG. 1 manages the cloud backup storage system 26 to transfer the corresponding data (i.e., the recommendation set including one or more determined subsets of data, also referred to as maximum savings sets, discussed above) from the first data storage 20 to the second data storage 22 based on the storage transfer recommendation 60. It will be appreciated that the BMS 44 may instruct the cloud backup storage system 26 to transfer the corresponding data from the first data storage 20 to the second data storage 22 based on the storage transfer recommendation 60 automatically, without communicating with the user. Once the recommendation set of the corresponding recovery points is transferred from the first data storage 20 to the second data storage 22, the data of the recommendation set of the corresponding recovery points may be deleted from the first data storage 20. It will be appreciated that the recommendation set of the corresponding recovery points likewise may be transferred and deleted from the third data storage 24, when the collection of data 18 was stored in the third data storage 24 instead of the second data storage 20.

FIGS. 4A and 4B show examples of various data structures used when performing the storage transfer recommendation algorithm 52 on another example set of incremental data backups using the computing system of FIG. 1. In the depicted example 500 in FIG. 4A, the first data storage 20 stores one hundred data blocks (A1, A2, A3 . . . A98, A99, A100) as a first recovery point (RP01), which is a full backup. Each block is 16 KB in size. After the initial backup, a portion of the data (A1-A5) is changed and saved (B1-B5) in the second recovery point (RP02), which is an incremental backup. After the second backup, another portion of the data (A6-A10) is changed and saved (C6-C10) as part of an incremental backup in the third recovery point (RP03). Following the third backup, another portion of the data (B1-B5, C6-C10, and D11-D15) is changed and saved (D1-D15) as part of an incremental backup in the fourth recovery point (RP04). After the fourth backup, another portion of data (D1-D15 and A16-A20) is changed and saved (E1-E20) as part of an incremental backup in the fifth recovery point (RP05).

In the same manner as discussed in relation to FIGS. 2A and 2B above, the algorithm 52 processes the first recovery point (RP01), and the sequence number 1 is assigned to each of the one hundred blocks of data to indicate that the blocks of data were last changed in the first recovery point, as depicted in Table 502. The algorithm 52 then generates an individual inherited mapping that the one hundred blocks of data (A1-A100) are assigned the sequence number 1 for the first recovery point, as shown in Table 504. In the next step, the algorithm 52 generates an effective savings mapping by determining the difference between incremental changed block value of one hundred blocks of data (A1-A100) and one hundred blocks of data inherited from the first recovery point for the sequence number 1, as shown in Table 506. The algorithm 52 determines the maximum savings set (SS01) and identifies that no blocks of data are in the maximum savings set which may be transferred to the second data storage 22 for the first recovery point, as shown in 508, as there is no recovery point that is assigned a second sequence number.

The algorithm 52 processes the second recovery point (RP02) and generates the individual inherited mapping as shown in Table 512 and effective savings mapping as shown in Table 514. The algorithm 52 then determines the maximum savings set (SS02) for the second recovery point by comparing the effective savings of the recovery point with the second greatest sequence number to a predetermined minimum saving value of fifteen. The second greatest sequence number in this iteration is the sequence number 1 in the depicted example and the effective savings for the first recovery point is zero, which does not satisfy the minimum savings value of fifteen. Thus, the algorithm 52 determines the maximum savings set and identifies that no blocks of data are in the maximum savings set (SS02) which may be transferred to the second data storage 22 for the second recovery point, as shown in 516.

The algorithm 52 processes the third recovery point (RP03) and generates the individual inherited mapping as shown in Table 520 of FIG. 4B and effective savings mapping as shown in Table 522 of FIG. 4B. The algorithm 52 then determines the maximum savings set (SS03) for the third recovery point by comparing the effective savings of the recovery point with the second greatest sequence number (which in this iteration is the sequence number 2) to a predetermined minimum saving value of fifteen. The average of the effective savings of the recovery point assigned the sequence number 2 is zero, which does not satisfy the minimum savings value of fifteen. Thus, the algorithm 52 considers the recovery point assigned the sequence number 1 in addition to the recovery point assigned the sequence number 2. The average of the effective savings of the recovery points assigned the sequence numbers 1 and 2 is 5, which does not satisfy the minimum savings value of fifteen. Thus, the algorithm 52 identifies that no blocks of data are in the maximum savings set (SS03) which may be transferred to the second data storage 22 for the third recovery point, as shown in 524.

The algorithm 52 processes the fourth recovery point (RP04) and generates the individual inherited mapping as shown in Table 528 and effective savings mapping as shown in Table 530. The algorithm 52 then determines the maximum savings set (SS04) for the fourth recovery point by comparing the effective savings of the recovery point with the second greatest sequence number (which in this iteration is the sequence number 3) to a predetermined minimum saving value of fifteen. The effective savings for the recovery point assigned the sequence number 3 is five, which does not satisfy the minimum savings value of fifteen. Next, the algorithm 52 considers the recovery point assigned the sequence number 2 in addition to the recovery point assigned the sequence number 3. The average of the effective savings of the recovery points assigned the sequence numbers 2 and 3 is five, which does not satisfy the minimum savings value of fifteen. The algorithm 52 further considers the recovery point assigned the sequence number 1, and the average of the effective savings of the recovery points assigned the sequence numbers 1, 2, and 3 is 8.3, which does not satisfy the minimum savings value of fifteen. Thus, the algorithm 52 identifies that no blocks of data are in the maximum savings set (SS04) which may be transferred to the second data storage 22 for the fourth recovery point, as shown in 532.

The algorithm 52 processes the fifth recovery point (RP05) and generates the individual inherited mapping as shown in Table 536 and effective savings mapping as shown in Table 538. The algorithm 52 then determines the maximum savings set (SS05) for the fifth recovery point by comparing the effective savings of the recovery point with the second greatest sequence number (which in this iteration is the sequence number 4) to a predetermined minimum saving value of fifteen. The average of the effective savings of the sequence number 4 is fifteen, which meets the minimum savings value of fifteen. Thus, the algorithm 52 identifies the effective savings from the recovery points assigned the sequence number 4 as the maximum savings set (SS05) which may be transferred to the second data storage 22 for the fifth recovery point, as shown in 540.

Once looping through each recovery point in the series and repeating the process above to determine the maximum savings set for each recovery point as discussed above, the algorithm 52 determines a recommendation set which is the union of the maximum savings set from each recovery point and makes a transfer recommendation for the recommendation set that may be transferred to archive for a user's maximum savings on storage. In the depicted example above, the algorithm 52 determines that no recovery points are included in the maximum savings sets for the first, second, third, and fourth recovery points, and the recovery point assigned the sequence number 4 is included in the maximum savings set for the fifth recovery point. The algorithm 52 determines that the union of the maximum savings set from each recovery point, which is the recommendation set, includes the effective savings from the recovery point assigned the sequence number 4 for the fifth recovery point, as described in 542 of FIG. 4B. That is, the algorithm 52 determines that fifteen blocks of data (D1-D15) from the fifth recovery point may be transferred to the second data storage 22 from the first data storage 20 and deleted from the first data storage 20.

FIGS. 5A and 5B show examples of various data structures used when performing the storage transfer recommendation algorithm 52 on another set of examples of incremental data backups using the computing system of FIG. 1. In the depicted example 600 in FIG. 5A, the first data storage 20 stores one hundred data blocks (A1, A2, A3 ... A98, A99, A100) as a first recovery point (RP01), which is a full backup. Each block is 16 KB in size. After the initial backup, a portion of the data (A1-A5) is changed and saved (B1-B5) in the second recovery point (RP02), which is an incremental backup. After the second backup, another portion of the data (A6-A10) is changed and saved (C6-C10) as part of an incremental backup in the third recovery point (RP03). Following the third backup, another portion of the data (A11-A15) is changed and saved (D11-D15) as part of an incremental backup in the fourth recovery point (RP04). After the fourth backup, another portion of data (B1-B5, C6-C10, D11-D15, and A16-A20) is changed and saved (E1-E20) as part of an incremental backup in the fifth recovery point (RP05).

In the same manner as discussed in FIGS. 4A and 4B above, the algorithm 52 processes the first recovery point (RP01), and the sequence number 1 is assigned to each of the one hundred blocks of data to indicate that the blocks of data were last changed in the first recovery point, as depicted in Table 602 of FIG. 5A. The algorithm 52 then generates an individual inherited mapping that the one hundred blocks of data (A1-A100) are assigned the sequence number 1 for the first recovery point, as shown in Table 604. In the next step, the algorithm 52 generates an effective savings mapping by determining the difference between incremental changed block value of one hundred blocks of data (A1-A100) and one hundred blocks of data inherited from the first recovery point for the sequence number 1, as shown in Table 606, and the algorithm 52 determines the maximum savings set (SS01) and identifies that no blocks of data are in the maximum savings set (SS01) which may be transferred to the second data storage 22 for the first recovery point, as shown in 608, as there is no recovery point that is assigned a second sequence number.

The algorithm 52 processes the second recovery point (RP02) and generates the individual inherited mapping as shown in Table 612 and effective savings mapping as shown in Table 614. The algorithm 52 then determines the maximum savings set (SS02) for the second recovery point by comparing the effective savings of the recovery point with the second greatest sequence number to a predetermined minimum saving value of fifteen. The second greatest sequence number in this iteration is the sequence number 1 and thus the effective savings for the first recovery point is zero, which does not satisfy the minimum savings value of fifteen. Thus, the algorithm 52 determines the maximum savings set (SS02) and identifies that no blocks of data are in the maximum savings set (SS02) which may be transferred to the second data storage 22 for the second recovery point, as shown in 616.

The algorithm 52 processes the third recovery point (RP03) and generates the individual inherited mapping as shown in Table 620 of FIG. 5B and effective savings mapping as shown in Table 622 of FIG. 5B. The algorithm 52 then determines the maximum savings set (SS03) for the third recovery point by comparing the effective savings of the recovery point with the second greatest sequence number (which in this iteration is the sequence number 2) to a predetermined minimum saving value of fifteen. The average of the effective savings of the recovery point assigned the sequence number 2 is zero, which does not satisfy the minimum savings value of fifteen. Thus, the algorithm 52 considers the recovery point assigned the sequence number 1 in addition to the recovery point assigned the sequence number 2. The average of the effective savings of the recovery points assigned the sequence numbers 1 and 2 is five, which does not satisfy the minimum savings value of fifteen. Thus, the algorithm 52 identifies that no blocks of data are in the maximum savings set (SS03) which may be transferred to the second data storage 22 for the third recovery point, as shown in 624.

The algorithm 52 processes the fourth recovery point (RP04) and generates the individual inherited mapping as shown in Table 628 and effective savings mapping as shown in Table 630. The algorithm 52 then determines the maximum savings set (SS04) for the fourth recovery point by comparing the effective savings of the recovery point with the second greatest sequence number (which in this iteration is the sequence number 3) to a predetermined minimum saving value of fifteen. The effective savings for the recovery point assigned the sequence number 3 is zero, which does not satisfy the minimum savings value of fifteen. Next, the algorithm 52 considers the recovery point assigned the sequence number 2 in addition to the recovery point assigned the sequence number 3. The average of the effective savings of the recovery points assigned the sequence numbers 2 and 3 is zero, which does not satisfy the minimum savings value of fifteen. The algorithm 52 further considers the recovery point assigned the sequence number 1, and the average of the effective savings of the recovery points assigned the sequence numbers 1, 2, and 3 is five, which does not satisfy the minimum savings value of fifteen. Thus, the algorithm 52 identifies that no blocks of data are in the maximum savings set (SS04) which may be transferred to the second data storage 22 for the fourth recovery point, as shown in 632.

The algorithm 52 processes the fifth recovery point (RP05) and generates the individual inherited mapping as shown in Table 636 and effective savings mapping as shown in Table 638. The algorithm 52 then determines the maximum savings set (SS05) for the fifth recovery point by comparing the effective savings of the recovery point with the second greatest sequence number (which in this iteration is the sequence number 4) to a predetermined minimum saving value of fifteen. The average of the effective savings of the sequence number 4 is five, which does not satisfy the minimum savings value of fifteen. Next, the algorithm 52 considers the recovery point assigned the sequence number 3 in addition to the recovery point assigned the sequence number 4. The average of the effective savings of the recovery points assigned the sequence numbers 3 and 4 is five, which does not satisfy the minimum savings value of fifteen. The algorithm 52 further considers the recovery point assigned the sequence number 2, and the average of the effective savings of the recovery points assigned the sequence numbers 2, 3, and 4 is five, which does not satisfy the minimum savings value of fifteen. The algorithm 52 further considers the recovery point assigned the sequence number 1, and the average of the effective savings of the recovery points assigned the sequence numbers 1, 2, 3, and 4 is 8.8, which does not satisfy the minimum savings value of fifteen. Thus, the algorithm 52 identifies that no blocks of data are in the maximum savings set (SS05) which may be transferred to the second data storage 22 for the fifth recovery point, as shown in 642.

Once looping through each recovery point in the series and repeating the process above to determine the maximum savings set for each recovery point as discussed above, the algorithm 52 determines a recommendation set which is the union of the maximum savings set from each recovery point and makes a transfer recommendation for the recommendation set that may be transferred to archive for a user's maximum savings on storage. In the depicted example above, the algorithm 52 determines that no recovery points are included in the maximum savings sets for all the first, second, third, fourth, and fifth recovery points, and thus the algorithm 52 recommends that no blocks of data from any recovery point should be transferred to the second data storage 22 from the first data storage 20.

Figure 6:
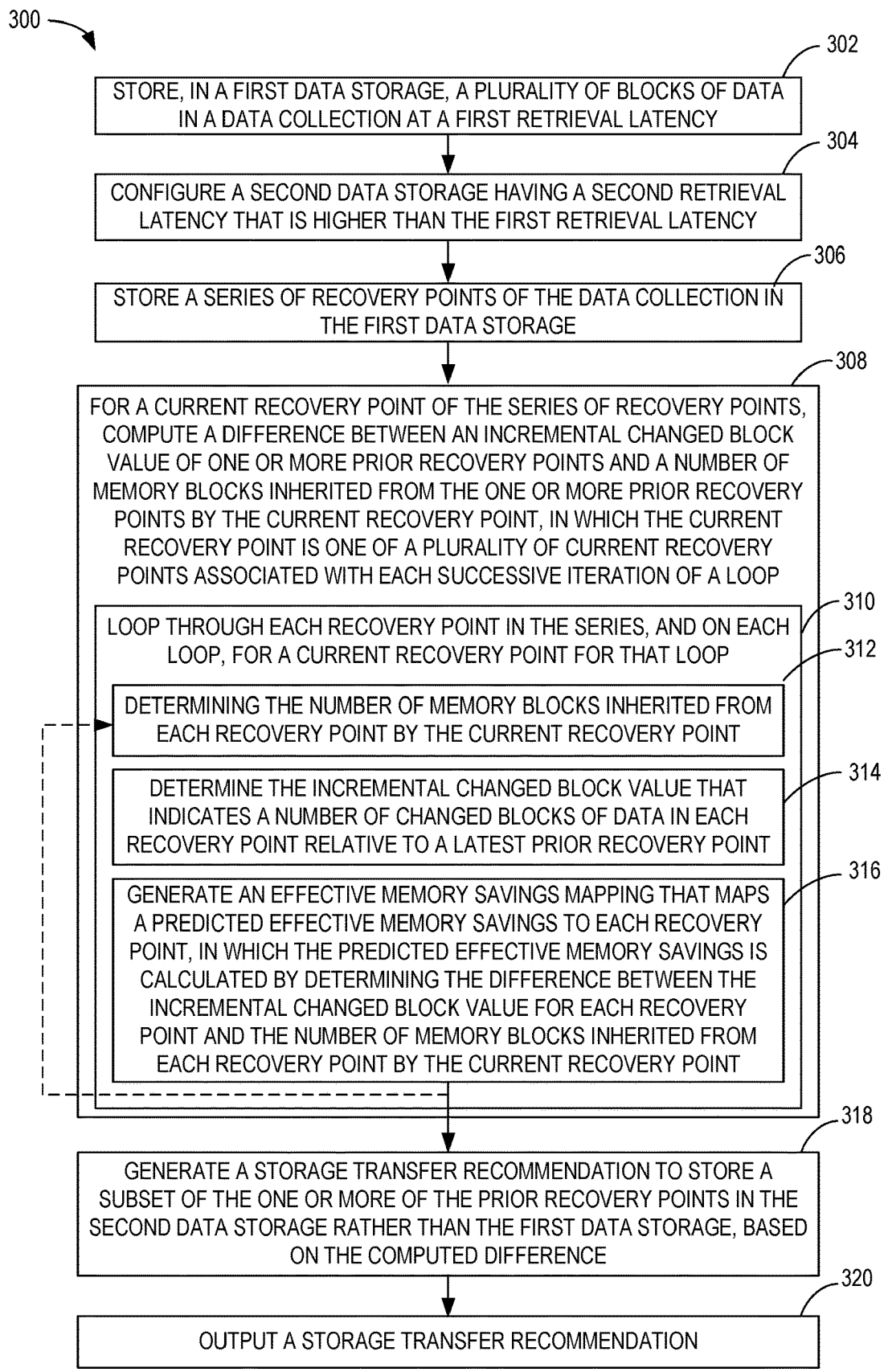
FIG. 6 shows a flowchart of a method according to one example implementation of the present disclosure.

FIG. 6 shows a flowchart of a computerized method 300 according to one example implementation of the present disclosure. The method 300 may be implemented using the software and hardware components of the computing system 2 described above, or other suitable software and hardware components. At step 302, the computerized method 300 may include storing, in a first data storage, a plurality of blocks of data in a data collection at a first retrieval latency. At step 304, the method may further include configuring a second data storage having a second retrieval latency that is higher than the first retrieval latency. At step 306, the method may further include storing a series of recovery points of the data collection in the first data storage. At step 308, for a current recovery point of the series of recovery points, the method may further include computing a difference between an incremental changed block value of one or more prior recovery points and a number of memory blocks inherited from the one or more prior recovery points, in which the current recovery point is one of a plurality of current recovery points associated with each successive iteration of a loop. At step 310, to compute the difference of the step 308, the method may further include looping through each recovery point in the series, and on each loop, for a current recovery point for that loop, performing the steps 312-316. At step 312, the method may further include determining the number of memory blocks inherited from each recovery point by the current recovery point. The number of member blocks inherited from each recovery point by the current recover point are stored in an individual inherited mapping data structure. At step 314, the method may further include determining the incremental changed block value that indicates a number of changed blocks of data in each recovery point relative to a latest prior recovery point. At step 316, the method may further include generating an effective memory savings mapping that maps a predicted effective memory savings to each recovery point, wherein the predicted effective memory savings is calculated by determining the difference between the incremental changed block value for each recovery point and the number of memory blocks inherited from each prior recovery point by the current recovery point. At step 318, the method may further include generating a storage transfer recommendation to store a subset of the one or more of the prior recovery points in the second data storage rather than the first data storage, based on the computed difference. At step 320, the method may further include outputting a storage transfer recommendation.

The method 300 may further include transferring the subset of the one or more of the prior recovery points to the second data storage from the first data storage based on the storage transfer recommendation, and deleting the subset of the one or more of the prior recovery points from the first data storage.

The method 300 may further include determining a recommendation set by computing a union of maximum savings sets for all of the recovery points in the series, wherein the subset for each recovery point is the maximum savings set, in which each maximum savings set meets a predetermined threshold for the predicted effective memory savings. In example implementations utilizing such a recommendation set, the method may further include transferring the recommendation set to the second data storage from the first data storage based on the storage transfer recommendation, and deleting the recommendation set from the first data storage.

The above-described systems and methods may be utilized to apply computer algorithms examining data storage records to programmatically identify opportunities for data storage transfer, which in turn may enable an organization to store its data with increased economic efficiency.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
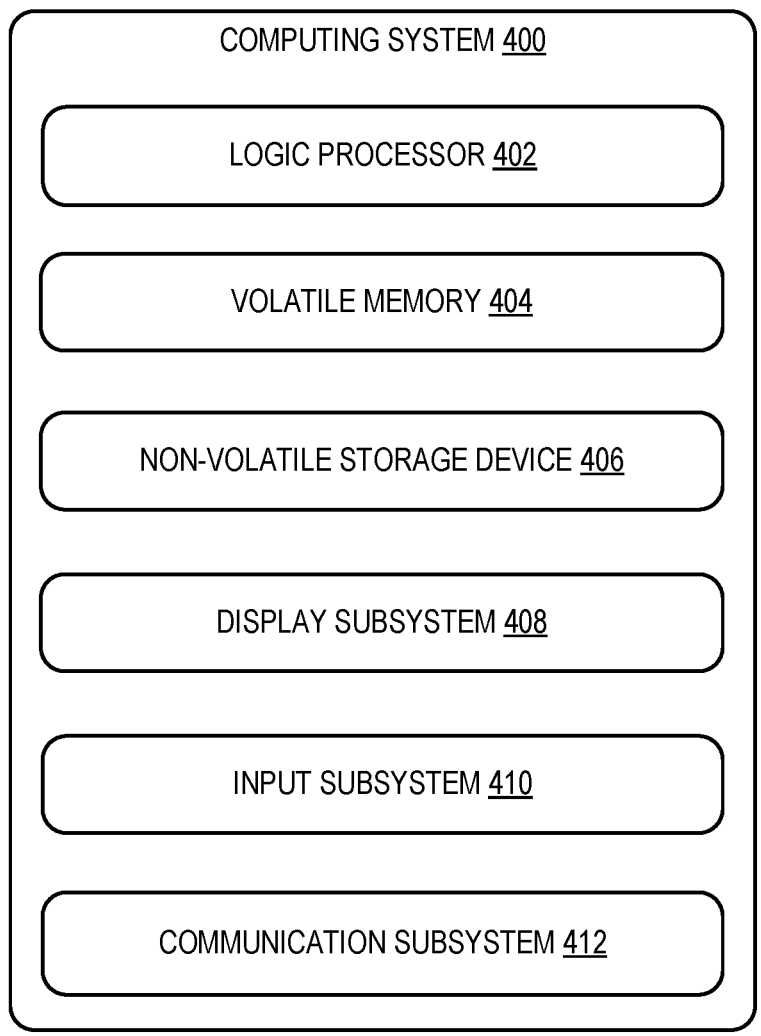
FIG. 7 shows a schematic view of an example computing environment in which the method of FIG. 6 may be enacted.

FIG. 7 schematically shows a non-limiting embodiment of a computing system 400 that can enact one or more of the methods and processes described above. Computing system 400 is shown in simplified form. Computing system 400 may embody the computer device described above and illustrated in FIG. 1. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 1.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computer system is provided. The computer system may include a first data storage configured to store a plurality of blocks of data in a data collection at a first retrieval latency and a second data storage having a second retrieval latency that is higher than the first retrieval latency. The computer system may further include a processor coupled to a memory that stores instructions, which, upon execution by the processor, cause the processor to store a series of recovery points of the data collection in the first data storage. For a current recovery point of the series of recovery points, the processor may be further configured to compute a difference between an incremental changed block value of one or more prior recovery points and a number of memory blocks inherited from the one or more prior recovery points by the current recovery point. The current recovery point may be one of a plurality of current recovery points associated with each successive iteration of a loop. The processor may be further configured to generate a storage transfer recommendation to store a subset of the one or more of the prior recovery points in the second data storage rather than the first data storage, based on the computed difference, and output the storage transfer recommendation.

According to this aspect, the processor may be configured to compute the difference at least in part by looping through each recovery point in the series. On each loop, for a current recovery point for that loop, the processor may determine the number of memory blocks inherited from each recovery point by the current recovery point. The processor may further determine the incremental changed block value that indicates the number of changed blocks of data in each recovery point relative to a latest prior recovery point. The processor may further generate an effective memory savings mapping that maps a predicted effective memory savings to each recovery point, wherein the predicted effective memory savings is calculated by determining the difference between the incremental changed block value for each recovery point and the number of memory blocks inherited from each recovery point by the current recovery point.

According to this aspect, the processor may be further configured to determine a recommendation set by computing a union of the maximum savings sets for all of the recovery points in the series, in which the subset for each recovery point is a maximum savings set, wherein the processor is configured to transfer the recommendation set to the second data storage from the first data storage based on the storage transfer recommendation, and delete the recommendation set from the first data storage.

According to this aspect, each maximum savings set may meet a predetermined threshold for the predicted effective memory savings.

According to this aspect, the predetermined threshold may be a predetermined average value of the predicted effective memory savings.

According to this aspect, the processor may be further configured to transfer the subset of the one or more of the prior recovery points to the second data storage from the first data storage based on the storage transfer recommendation.

According to this aspect, the processor may be further configured to delete the recommendation set of the subset of the one or more of the prior recovery points from the first data storage.

According to this aspect, the data collection may include binary large object (BLOB) data.

According to this aspect, the difference between the first retrieval latency and the second retrieval latency may be at least six orders of magnitude.

According to this aspect, the computer system may further include a third data storage having a third retrieval latency that is higher than the first retrieval latency and lower than the second retrieval latency, in which the processor is configured to transfer the subset of the one or more of the prior recovery points to the second data storage from the first data storage and/or the third data storage.

According to this aspect, the first data storage may include a hard disk drive or solid-state drive, while the second data storage may include a tape storage drive. Alternatively, the first data storage may include a solid-state drive, while the second data storage may include a hard disk drive.

According to another aspect of the present disclosure, a computerized method is provided. The computerized method may include storing, in a first data storage, a plurality of blocks of data in a data collection at a first retrieval latency. The computerized method may further include configuring a second data storage having a second retrieval latency that is higher than the first retrieval latency.

The computerized method may further include storing a series of recovery points of the data collection in the first data storage. For a current recovery point of the series of recovery points, the computerized method may further include computing a difference between an incremental changed block value of one or more prior recovery points and a number of memory blocks inherited from the one or more prior recovery points by the current recovery point, in which the current recovery point is one of a plurality of current recovery points associated with each successive iteration of a loop. The computerized method may further include generating a storage transfer recommendation to store a subset of the one or more of the prior recovery points in the second data storage rather than the first data storage, based on the computed difference and outputting a storage transfer recommendation.

According to this aspect, computing the difference may be accomplished at least in part by looping through each recovery point in the series. On each loop, for a current recovery point for that loop, the number of memory blocks inherited from each recovery point by the current recovery point may be created. The incremental changed block value that indicates a number of changed blocks of data in each recovery point relative to a latest prior recovery point may be further determined. An effective memory savings mapping that maps a predicted effective memory savings to each recovery point may be further generated, wherein the predicted effective memory savings is calculated by determining the difference between the incremental changed block value for each recovery point and the number of memory blocks inherited from each recovery point by the current recovery point.

According to this aspect, the computerized method may further include determining a recommendation set by computing a union of maximum savings sets for all of the recovery points in the series, wherein the subset for each recovery point is the maximum savings set, transferring the recommendation set to the second data storage from the first data storage based on the storage transfer recommendation, and deleting the recommendation set from the first data storage.

According to this aspect, each maximum savings set may meet a predetermined threshold for the predicted effective memory savings.

According to this aspect, the computerized method may further include transferring the subset of the one or more of the prior recovery points to the second data storage from the first data storage based on the storage transfer recommendation.

According to this aspect, the computerized method may further include deleting the subset of the one or more of the prior recovery points from the first data storage.

According to this aspect, the difference between the first retrieval latency and the second retrieval latency may be at least six orders of magnitude.

According to this aspect, the first data storage may be a hard disk drive or solid-state drive, while the second data storage may be a tape storage drive. Alternatively, the first data storage may include a solid-state drive, while the second data storage may include a hard disk drive.

According to another aspect of the present disclosure, a computer system may include a first data storage configured to store a plurality of blocks of data in a data collection at a first retrieval latency and a second data storage having a second retrieval latency that is higher than the first retrieval latency. The computer system may further include a processor coupled to a memory that stores instructions, which, upon execution by the processor, cause the processor to store a series of recovery points of the data collection in the first data storage. The processor may be configured to loop through each recovery point, and on each loop, for a current recovery point of the series of recovery points for that loop, determine a number of memory blocks inherited from each recovery point by the current recovery point. On each loop, the processor may be further configured to determine an incremental changed block value that indicates a number of changed blocks of data in each recovery point relative to a latest prior recovery point. On each loop, the processor may be further configured to determine a difference between the incremental changed block value of one or more prior recovery points and the number of memory blocks inherited from the one or more prior recovery points by the current recovery point. The processor may be further configured to output a storage transfer recommendation to store a subset of the one or more of the prior recovery points in the second data storage rather than the first data storage, based on the difference between the incremental changed block value and the number of memory blocks inherited.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system, comprising:
   a first data storage configured to store a plurality of blocks of data in a data collection at a first retrieval latency;
   a second data storage having a second retrieval latency that is higher than the first retrieval latency; and
   a processor coupled to a memory that stores instructions, which, upon execution by the processor, cause the processor to:
   store a series of recovery points of the data collection in the first data storage;
   for a current recovery point of the series of recovery points, compute a predicted memory savings based on a difference between an incremental changed block value of one or more prior recovery points and a number of memory blocks inherited from the one or more prior recovery points by the current recovery point;
   generate a storage transfer recommendation to store a subset of the one or more of the prior recovery points in the second data storage rather than the first data storage, based on the predicted memory savings of the prior recovery points; and
   output the storage transfer recommendation.

2. The computer system of claim 1, wherein the current recovery point is one of a plurality of current recovery points associated with each successive iteration of a loop, and the processor is configured to compute the difference for each recovery point in the series of recovery points at least in part by:

looping through each recovery point in the series, and on each loop, for a current recovery point for that loop:
  determining a number of memory blocks inherited from each recovery point by the current recovery point;
  determining the incremental changed block value that indicates the number of changed blocks of data in each recovery point relative to a recovery point immediately preceding the current recovery point; and
  generating an effective memory savings mapping that maps a predicted effective memory savings to each recovery point, wherein the predicted effective memory savings is calculated by determining the difference between the incremental changed block value for each recovery point and the number of memory blocks inherited from each recovery point by the current recovery point.

3. The computer system of claim 1, wherein the subset for each recovery point is a maximum savings set of the predicted memory savings of the prior recovery points, and wherein the processor is further configured to determine a recommendation set by computing a union of the maximum savings sets for all of the recovery points in the series, wherein the processor is configured to transfer the recommendation set to the second data storage from the first data storage based on the storage transfer recommendation, and delete the recommendation set from the first data storage.

4. The computer system of claim 3, wherein each maximum savings set meets a predetermined threshold for the predicted effective memory savings.

5. The computer system of claim 4, wherein the predetermined threshold is a predetermined average value of the predicted effective memory savings.

6. The computer system of claim 1, wherein the processor is configured to transfer the subset of the one or more of the prior recovery points to the second data storage from the first data storage based on the storage transfer recommendation.

7. The computer system of claim 6, wherein the processor is further configured to delete the subset of the one or more of the prior recovery points from the first data storage.

8. The computer system of claim 1, wherein the data collection includes binary large object (BLOB) data.

9. The computer system of claim 1, wherein the difference between the first retrieval latency and the second retrieval latency is at least six orders of magnitude.

10. The computer system of claim 1, comprising:
a third data storage having a third retrieval latency that is higher than the first retrieval latency and lower than the second retrieval latency, wherein the processor is configured to transfer the subset of the one or more of the prior recovery points to the second data storage from the first data storage and/or the third data storage.

11. The computer system of claim 1, wherein
the first data storage includes a hard disk drive or solid-state drive, while the second data storage includes a tape storage drive; or
the first data storage includes a solid-state drive, while the second data storage includes a hard disk drive.

12. A computerized method, comprising:
storing, in a first data storage, a plurality of blocks of data in a data collection at a first retrieval latency;
configuring a second data storage having a second retrieval latency that is higher than the first retrieval latency; and
storing a series of recovery points of the data collection in the first data storage;
  for a current recovery point of the series of recovery points, computing a difference between an incremental changed block value of one or more prior recovery points and a number of memory blocks inherited from the one or more prior recovery points by the current recovery point;
  generating a storage transfer recommendation to store a subset of the one or more of the prior recovery points in the second data storage rather than the first data storage, based on the predicted memory savings of the prior recovery points; and
  outputting a storage transfer recommendation.

13. The method of claim 12, wherein the current recovery point is one of a plurality of current recovery points associated with each successive iteration of a loop, and computing the difference is accomplished at least in part by:
  looping through each recovery point in the series, and on each loop, for a current recovery point for that loop;
  determining the number of memory blocks inherited from each recovery point by the current recovery point;
  determining the incremental changed block value that indicates a number of changed blocks of data in each recovery point relative to a recovery point immediately preceding the current recovery point; and
  generating an effective memory savings mapping that maps a predicted effective memory savings to each recovery point, wherein the predicted effective memory savings is calculated by determining the difference between the incremental changed block value for each recovery point and the number of memory blocks inherited from each recovery point by the current recovery point.

14. The method of claim 12, further comprising:
  determining a recommendation set by computing a union of maximum savings sets for all of the recovery points in the series, wherein the subset for each recovery point is the maximum savings set of the predicted memory savings of the prior recovery points;
  transferring the recommendation set to the second data storage from the first data storage based on the storage transfer recommendation; and
  deleting the recommendation set from the first data storage.

15. The method of claim 14, wherein each maximum savings set meets a predetermined threshold for the predicted effective memory savings.

16. The method of claim 12, further comprising:
  transferring the subset of the one or more of the prior recovery points to the second data storage from the first data storage based on the storage transfer recommendation.

17. The method of claim 16, further comprising:
  deleting the subset of the one or more of the prior recovery points from the first data storage.

18. The method of claim 12, wherein the difference between the first retrieval latency and the second retrieval latency is at least six orders of magnitude.

19. The method of claim 12, wherein
the first data storage is a hard disk drive or solid-state drive, while the second data storage is a tape storage drive, or
the first data storage includes a solid-state drive, while the second data storage includes a hard disk drive.

20. A computer system, comprising:
a first data storage configured to store a plurality of blocks of data in a data collection at a first retrieval latency;

a second data storage having a second retrieval latency that is higher than the first retrieval latency; and a processor coupled to a memory that stores instructions, which, upon execution by the processor, cause the processor to:

store a series of recovery points of the data collection in the first data storage; loop through each recovery point, and on each loop, for a current recovery point of the series of recovery points for that loop:

determine a number of memory blocks inherited from each recovery point by the current recovery point;

determine an incremental changed block value that indicates a number of changed blocks of data in each recovery point relative to a recovery point immediately preceding the current recovery point; and determine a difference between the incremental changed block value of one or more prior recovery points and the number of memory blocks inherited from the one or more prior recovery points by the current recovery point; and output a storage transfer recommendation to store a subset of the one or more of the prior recovery points in the second data storage rather than the first data storage, based on predicted memory savings of the difference between the incremental changed block value and the number of memory blocks inherited.

\* \* \* \* \*